May 8, 1962
H. C. N. HECKEL ETAL
3,033,917
ARTICLE OF MANUFACTURE USING A BRAIDED CORE
CONSTRUCTION AND METHOD OF MAKING
Filed Aug. 28, 1958
2 Sheets-Sheet 1
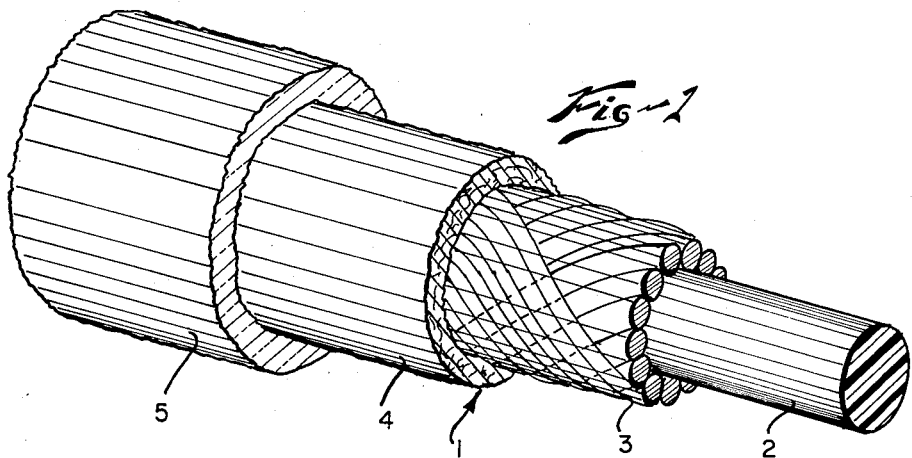
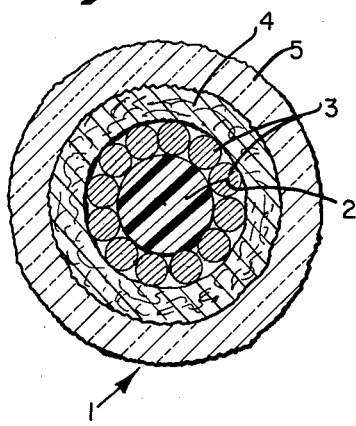
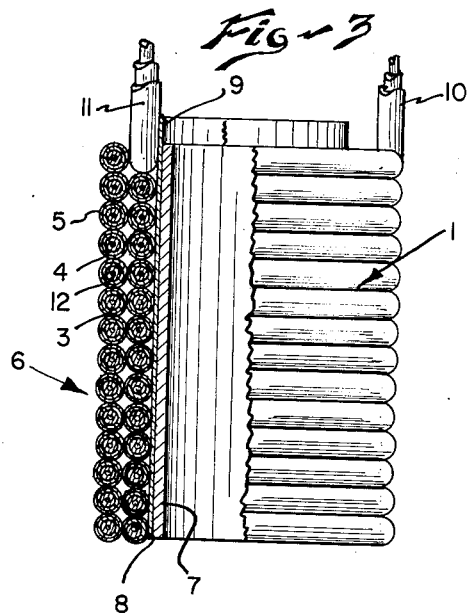
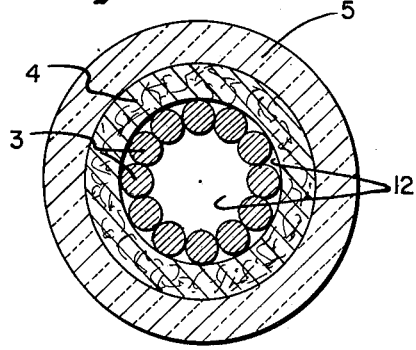
INVENTOR.
HERMANN C.N. HECKEL
ROBERT T. JEFFERSON JR.
BY
*Toulmin & Toulmin*
ATTORNEYS May 8, 1962 H. C. N. HECKEL ETAL 3,033,917
ARTICLE OF MANUFACTURE USING A BRAIDED CORE
CONSTRUCTION AND METHOD OF MAKING
Filed Aug. 28, 1958 2 Sheets-Sheet 2
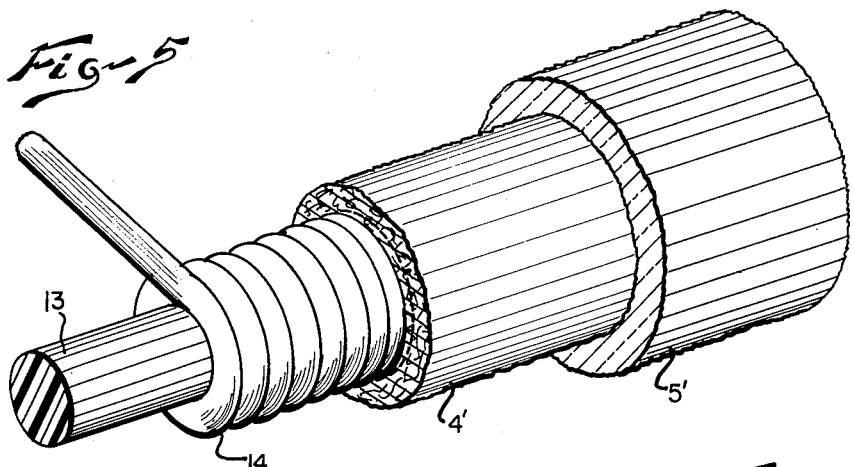
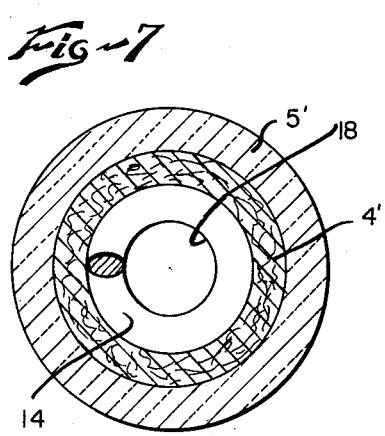
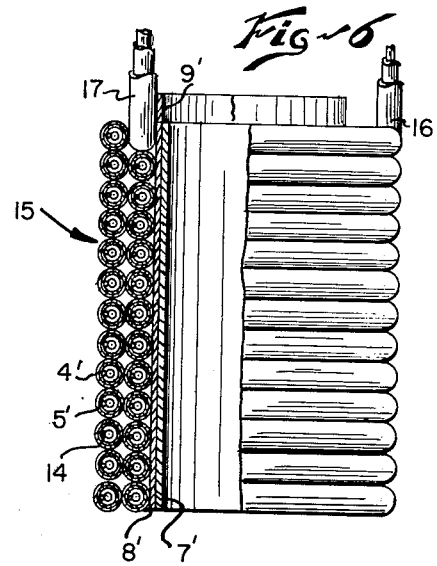
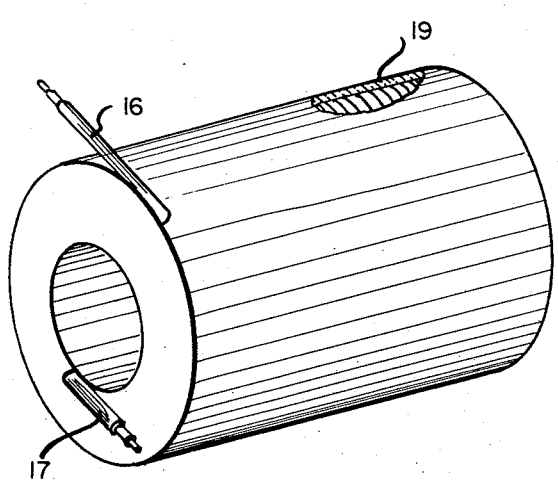
INVENTOR.
HERMANN C.N. HECKEL
ROBERT T. JEFFERSON JR
BY
*Toulmin & Toulmin*
ATTORNEYS United States Patent Office 3,033,917
Patented May 8, 1962

3,033,917
ARTICLE OF MANUFACTURE USING A BRAIDED CORE CONSTRUCTION AND METHOD OF MAKING
Hermann C. N. Heckel, Oxford, and Robert T. Jefferson, Jr., Dayton, Ohio, assignors, by mesne assignments, to Rea Magnet Wire Company, Inc., Fort Wayne, Ind., a corporation of Delaware
Filed Aug. 28, 1958, Ser. No. 757,790
3 Claims. (Cl. 174—121)

This invention relates to new and improved electrical conductors and electrical components in coil form which are operable at high temperatures, that is 500° C. and above.

The electrical characteristics of conductors and components utilizing inorganic materials as insulation are known to be desirable and are employed with success in instances where flexibility and mechanical ruggedness are not important factors. However, with respect particularly to electric coils, wherein operation at elevated temperatures is frequently a requisite, the insulation materials generally deteriorate rapidly. This is due in large measure to the constant expansion and contraction of the conductor relative to the insulation, which tends to cause rupture in the material and to result in coil failure. Such failures are occasioned in coils when the conductor contracts upon cooling and stresses the insulation tensively.

A primary object of this invention is to provide a novel combination of insulation material and an electrical conductor whereby the effects of repeated expansion and contraction are compensated by the arrangement of the insulated conductor.

A further object of the invention is to provide a novel method of forming an electric coil wherein the coil is fired and an expansion cavity is produced during the firing. This cavity is such as to provide the electrical conductor as a tube and accordingly the conductor may readily contract.

Another object of the invention is to provide an electrical coil the insulated conductor of which is tubular and surrounded by loose fitting inorganic insulation material. The conductor is thus free to expand and contract relative to the insulation and the insulation itself provides a cushion between layers or turns to provide for absorption of stress occasioned by the heating and cooling of the conductor.

The invention will be more fully understood by reference to the following detailed description and accompanying drawings wherein:

FIGURE 1 is a perspective view of an insulated electrical conductor useful in the practice of the invention;

FIGURE 2 is a cross-sectional view of the insulated conductor of FIGURE 1;

FIGURE 3 is an elevational view, with parts broken away, illustrating a coil formed with the electrical conductor of FIGURES 1 and 2;

FIGURE 4 is a sectional view of the electrical conductor of the coil after firing of the coil;

FIGURE 5 is a perspective view of a further embodiment of an electrical conductor useful in the practice of the invention;

FIGURE 6 is an elevational view, with parts broken away, illustrating a coil formed of the electrical conductor of FIGURE 5;

FIGURE 7 is a cross-sectional view of an electrical conductor of the coil of FIGURE 6 after firing of the coil; and FIGURE 8 is a perspective view illustrating a fully encapsulated coil produced in accordance with the invention.

Referring to the drawings an electrical conductor, indicated generally at 1 in FIGURE 1, is provided with a central body 2 in the form of plastic material, such as Mylar, nylon or methyl methacrylate, or polyurethane.

Surrounding this central body 2 is a braid 3 of copper wire. No. 30 bare wire has been used. About the braid 3 there is provided a resilient wrapping 4 of a high softening point inorganic material, such as substantially pure silica fiber. Such fiber is available commercially under the trade name Refrasil, a product which consists of approximately 96 percent silica, the remainder being inorganic oxides, but substantially alkali-free. Further, this fiber has a softening point well in excess of 850° C. The high silica content fiber, in addition, is not substantially reactive chemically with the copper of the braid even at relatively high temperatures.

A sheath 5 formed of glass fiber yarn is provided about the wrapping 4. This sheath is also of inorganic material and suitably comprises fibers of an electrical glass. Such fibers are available commercially in the form of a tape or yarn.

A particularly suitable glass known commercially as E glass treated with methacrylate chromic chloride has a sintering point of about 825° C., and is particularly suitable for the purpose of the invention.

The electrical conductor ilustrated in FIGURES 1 and 2 is flexible and may be readily wound into coil form, as shown in FIGURE 3. The coil is designated generally at 6 and comprises a spool 7 of Steatite or ceramic material, or a material which is not deformable at high temperatures of 1000° C. and above.

Provided on the spool 7 is a layer in the form of a tape 8 of a high softening point inorganic material such as aluminum silicate fibers. Such fibers are available commercially under the trade name Fiberfrax.

Suitably the Fiberfrax has an extension 9 projecting beyond an end of the spool 7 for the purpose of permitting the Fiberfrax to be pulled readily from the spool, in order that the spool of Fiberfrax may be removed readily from a completed fired coil, when such is desired.

The electrical conductor of FIGURE 1 is formed on the Fiberfrax in the coil form indicated and is provided with leads 10, 11 integral with the conductor.

In the practice of the invention the coil provided, as shown in FIGURE 3, when the core is of nylon, is first heated to a temperature of approximately 250–400° C., and maintained at this temperature for approximately a half hour. Suitably also a good current of air is provided over the coil. Under this condition the nylon thermally decomposes, the volatilized material passing through the interstices of the braid 3, the high softening point inorganic material 4, and the relatively low sintering point material 5.

The firing at this temperature results in the conductor having a cross-section such as that illustrated in FIGURE 4, wherein the numeral 12 designates a central expansion cavity. To complete the firing of the coil the temperature is raised to approximately 825° C. to effect sintering of the sheath material, that is the E glass. The sheath material, to some slight extent, enters the interstices of the wrapping 4, but does not penetrate to the copper braid 3, nor does it cause a stiffening of the fibrous structure of the wrapping 4. The sintering forms a film over the turns of the coil, such that the coil when cooled will be in a rigid condition, but the mechanical bond afforded by the film to the wrapping is somewhat poor— merely sufficient to effect retention of the film.

FIGURE 5 illustrates a further modification in which a plastic core designated at 13 and suitably of methyl methacrylate is surrounded by a winding of copper wire 14. The copper wire is itself provided with a wrapping 4' of tape composed of silica fibers, as already described.

The wrapping 4' is covered with a sheath 5' of E glass fibers, also as already described. This conductor is flexible and readily wound into the coil indicated at 15, the coils having a ceramic spool 7', a layer of high melting point aluminum silica fibers 8', which fibers project at 9' from the spool 7'.

The leads of the coil are indicated at 16, 17 and the coil is subjected to an initial firing treatment at a temperature of about 250–400° C. to burn out the plastic. This is accomplished by maintaining the coil at the temperature designated for approximately half an hour, whereupon the plastic decomposes to its monomer and vaporizes without any substantial carbon formation, leaving the hollow conductor. The products of the firing pass out through the interstices of the wrapping 4' and the sheath 5', leaving a central cavity 18 (FIGURE 7) in the conductor. The sintering operation is then effected as described hereinbefore.

The coil of FIGURE 6 is suitably encapsulated by providing a quantity of yarn of the same material as the sheath about the cooled but fired coil and heating the coil to cause fusion of the glass fibers resulting in the encapsulation material shown at 19 in FIGURE 8.

With the tubular construction and the provision of the insulation material in such manner that it is slidable or slippable relative to the conductor, the conductor may expand freely. The conductor itself in this instance, due to its permeable nature, assists the tubular formation, providing expansion cavities for the metal.

It will be understood that this invention is susceptible to modification in order to adapt it to different usages and conditions and accordingly, it is desired to comprehend such modifications within this invention as may fall within the scope of the appended claims.

What is claimed is:

1. A article of manufacture comprising a braided tubular permeable electrical conductor, a body of resilient electrical insulation material slidable upon the conductor and substantially inert chemically with the conductor at elevated temperatures, and a sheath of inorganic material sintered to the said body of electrical insulation and forming a continuous film thereon.

2. An insulated electrical component comprising a braided tubular electrical conductor which is permeable, a resilient wrapping of siliceous fibers loosely fitting the electrical conductor whereby the tubular conductor may expand and contract substantially freely, and an outer sintered refractory di-electric material on the wrapping of lower softening point than the material of the wrapping and substantially inert chemically with the wrapping at its sintering temperature, said outer sintered refractory di-electric material being in the form of a thin covering film.

3. An electric coil comprising a spool of a refractory material, a layer of a temperature-resistant tape on the spool, a winding on the tape of an insulated, braided, pervious, electrical conductor which comprises turns of a conductive element, a wrapping of fibers on the conductor and slidable relative to the conductor, and a sheath of sintered siliceous material on the wrapping forming a film over the turns, said wrapping and sheath extending over the length of the conductor insulating adjacent turns.

References Cited in the file of this patent

UNITED STATES PATENTS

| | | |
|---|---|---|
| 1,814,102 | Weiset | July 14, 1931 |
| 2,075,906 | Maude | Apr. 6, 1937 |
| 2,390,039 | Slayter et al. | Nov. 27, 1945 |
| 2,484,214 | Ford et al. | Oct. 11, 1949 |
| 2,504,764 | Vollrath | Apr. 18, 1950 |
| 2,848,794 | Roth | Aug. 26, 1958 |

FOREIGN PATENTS

| | | |
|---|---|---|
| 710,711 | Great Britain | June 16, 1954 |
| 783,064 | Great Britain | Sept. 18, 1957 |
| 1,159,346 | France | Feb. 10, 1958 |